UNITED STATES PATENT OFFICE.

CHARLES M. HIGGINS, OF BROOKLYN, NEW YORK.

INK.

SPECIFICATION forming part of Letters Patent No. 483,446, dated September 27, 1892.

Application filed January 23, 1892. Serial No. 418,986. (No specimens.) Patented in England January 2, 1892, No. 93; in France January 6, 1892, No. 218,495, and in Belgium January 7, 1892, No. 97,830.

*To all whom it may concern:*

Be it known that I, CHARLES M. HIGGINS, a citizen of the United States, residing at Brooklyn, in the county of Kings and State of New York, have invented certain new and useful Improvements in Inks, (for which I have obtained Letters Patent of Great Britain, dated January 2, 1892, No. 93; of France, dated January 6, 1892, No. 218,495, and of Belgium, dated January 7, 1892, No. 97,830,) of which the following is a specification.

My invention applies more especially to ink for rubber stamps, but is not confined thereto; and the main object of my improvement is to provide a new vehicle for this purpose which will entirely dispense with the generally-used glycerine and employ instead a true non-drying oily fluid which will yet have no solvent or injurious action on rubber stamps and be capable of holding aniline or other colors in solution. An ink thus made will be waterproof and not susceptible to atmospheric moisture, will not smut when printed, and yet will not dry on the inking-pad, and hence will form a new and valuable ink for the purpose named.

To this end my invention consists, essentially, in the combination, with an aniline or other coloring-matter, of a solvent for the same, together with castor-oil, forming the vehicle of the ink, as hereinafter fully set forth.

I have discovered that castor-oil is an exception among the animal and vegetable oils in having no solvent action whatever on rubber, though left constantly soaking in the oil. This oil, however, has but little solvent action on aniline colors, and although it will dissolve them a little better than most of the other fixed oils it will not dissolve sufficient by itself for the purpose of an ink. I therefore use with the castor-oil some powerful solvent for the coloring-matter, preferably using such a color-solvent as has in itself no solvent action on the rubber. The best solvents of this character are the alcohols, the phenols, and the essential oils of some of the common spices. In a separate application, filed February 19, 1892, Serial No. 422,119, I claim the combination of carbolic acid or other phenol with castor or other fixed oil and a coloring-matter, and my present application is confined strictly to the combination of castor-oil with a coloring-matter and a solvent and does not cover other fixed oils nor the combination, broadly, of phenols with fixed oils, as set forth in the other application. In making my improved ink I therefore dissolve any suitable aniline color in ethyl or other suitable alcohol, or in oil of cassia, or, in fact, any other suitable solvent, and when the solution is perfected I add to this solution a large proportion of castor-oil, pouring it in gradually and stirring the two together until perfectly mixed, which will then form a smooth oily ink holding the color in perfect solution. I prefer to use for this color-solvent the oil of cassia, as this oil is an intense solvent for most of the aniline colors and has no action whatever on rubber and is practically fixed or non-drying, unlike the volatile phenols and alcohols.

The proportions which may be used will vary with the strength of inks desired; but the following formula will be a fair example of a practical mixture: one ounce, avoirdupois, of methyl-violet, green crystals, or other coloring-matter, one to two fluid ounces of the oil of cassia or other solvent, and three to six fluid ounces of castor-oil. This will make a very fluid oily ink, which may be used to saturate the inking-pads for rubber stamps or similar purposes, which will be entirely proof to atmospheric influences, will not dry or harden on the pad, and will not injure rubber or metal stamps. It will dry at once by absorption in the paper when imprinted and will not blur or smut on contact with moist fingers, and yet will afford a press-copy, if desired, when subjected to the copying-press, thus forming a valuable ink for hand-stamps and many other purposes.

What I claim as my invention is—

1. A fluid oily ink for stamping, printing, or other purpose, formed of a color-solvent, a coloring-matter dissolved thereby, and castor-oil combined therewith, substantially as herein set forth.

2. An oily ink composed of oil of cassia, a coloring-matter dissolved thereby, and castor-oil combined therewith, substantially as and for the purpose set forth.

3. An oily ink composed of an aniline color, oil of cassia, and castor-oil, combined substantially as herein set forth.

CHAS. M. HIGGINS.

Witnesses:
JNO. E. GAVIN,
HENRIETTA H. NICOLAI.